US012769327B2

(12) United States Patent
Chen et al.

(10) Patent No.: US 12,769,327 B2
(45) Date of Patent: Oct. 20, 2026

(54) SYSTEM AND METHOD FOR AUTONOMOUS MOBILE ROBOT TO RIDE AND CO-SHARE ELEVATOR WITH HUMAN(S)

(71) Applicant: Delta Electronics Int'l (Singapore) Pte Ltd, Singapore (SG)

(72) Inventors: Chun-Lin Chen, Singapore (SG); Srikiran Rao Surathi, Singapore (SG); Prem Manoharan, Singapore (SG); Yongjun Wee, Singapore (SG); Qing Liu, Singapore (SG)

(73) Assignee: Delta Electronics Int'l (Singapore) Pte Ltd, Singapore (SG)

( * ) Notice: Subject to any disclaimer, the term of this patent is extended or adjusted under 35 U.S.C. 154(b) by 95 days.

(21) Appl. No.: 18/611,618

(22) Filed: Mar. 20, 2024

(65) Prior Publication Data

US 2024/0319743 A1 Sep. 26, 2024

Related U.S. Application Data

(60) Provisional application No. 63/453,847, filed on Mar. 22, 2023.

(30) Foreign Application Priority Data

Feb. 23, 2024 (SG) .......................... 10202400501W

(51) Int. Cl.
*G05D 1/633* (2024.01)
*G05D 107/60* (2024.01)

(52) U.S. Cl.
CPC ......... *G05D 1/633* (2024.01); *G05D 2107/60* (2024.01)

(58) Field of Classification Search
CPC ........................... G05D 1/633; G05D 2107/60
See application file for complete search history.

(56) References Cited

U.S. PATENT DOCUMENTS 9,251,417 B1 2/2016 Xu et al.
9,870,624 B1 1/2018 Narang et al.
(Continued)

FOREIGN PATENT DOCUMENTS

CN 110775735 A 2/2020
CN 110861095 A * 3/2020 ............ B25J 9/1666
(Continued)

*Primary Examiner* — Hunter B Lonsberry
*Assistant Examiner* — Harrison Heflin
(74) *Attorney, Agent, or Firm* — KIRTON McCONKIE; Evan R. Witt

(57) ABSTRACT

A system and a method for an autonomous mobile robot to ride and co-share an elevator with human(s) are disclosure. The core software modules and method proposed include a human detection and localization module, a human identification and state estimation module, a human-robot-interaction module, and an elevator confined space positioning module. Upon an elevator riding task is started, the human detection and localization module and the human identification and state estimation module detect and count the at least one human inside and/or outside the elevator, and the human-robot-interaction module interacts with the at least one human. The elevator confined space positioning module carries out a space positioning inside the elevator according to a result of detecting and counting the at least one human through the human detection and localization module and the human identification and state estimation module, and chooses to enter the elevator or restart another elevator riding task.

8 Claims, 9 Drawing Sheets

(56) References Cited

U.S. PATENT DOCUMENTS

| | | | | |
|---|---|---|---|---|
| 11,467,581 | B2 | 10/2022 | Takai et al. | |
| 2005/0182518 | A1 | 8/2005 | Karlsson | |
| 2008/0193009 | A1 | 8/2008 | Sonoura | |
| 2011/0222727 | A1 | 9/2011 | Sharma | |
| 2012/0041593 | A1* | 2/2012 | Ichinose | B66B 1/2458 700/258 |
| 2016/0059416 | A1* | 3/2016 | Tian | B25J 5/02 701/19 |
| 2016/0295196 | A1* | 10/2016 | Finn | G06T 7/20 |
| 2019/0323852 | A1 | 10/2019 | Ondruska et al. | |
| 2021/0154843 | A1* | 5/2021 | Choi | G05D 1/021 |
| 2021/0284485 | A1* | 9/2021 | Nichols | B66B 1/468 |
| 2021/0339399 | A1* | 11/2021 | Schluntz | G05D 1/0088 |
| 2021/0371236 | A1* | 12/2021 | Deng | B66B 1/3461 |
| 2021/0405649 | A1 | 12/2021 | Eoh et al. | |
| 2022/0194737 | A1* | 6/2022 | Oda | B66B 1/3461 |
| 2024/0184305 | A1* | 6/2024 | Song | B66B 1/2408 |

FOREIGN PATENT DOCUMENTS

| | | | |
|---|---|---|---|
| CN | 111099462 | A | 5/2020 |
| CN | 111678517 | A | 9/2020 |
| CN | 111728533 | A | 10/2020 |
| CN | 112591571 | A | 4/2021 |
| CN | 112850388 | A | 5/2021 |
| CN | 107538463 | | 12/2021 |
| CN | 113752269 | A | 12/2021 |
| CN | 114084758 | A | 2/2022 |
| CN | 216286316 | U | 4/2022 |
| CN | 114505840 | A | 5/2022 |
| CN | 114779782 | A | 7/2022 |
| CN | 217138737 | U | 8/2022 |
| CN | 115164893 | A | 10/2022 |
| CN | 115625703 | A | 1/2023 |
| JP | 2007210801 | A | 8/2007 |
| JP | 2009258821 | A | 11/2009 |
| JP | 2012017184 | A | 1/2012 |
| JP | 2022130228 | A | 9/2022 |
| JP | 2022169161 | A | 11/2022 |
| TW | 201814415 | A | 4/2018 |
| WO | 2021221343 | A1 | 11/2021 |

* cited by examiner

SYSTEM AND METHOD FOR AUTONOMOUS MOBILE ROBOT TO RIDE AND CO-SHARE ELEVATOR WITH HUMAN(S)

CROSS-REFERENCE TO RELATED APPLICATION

This application claims the benefit of U.S. Provisional Application No. 63/453,847 filed on Mar. 22, 2023, and entitled "SYSTEM AND METHOD FOR AUTONOMOUS MOBILE ROBOT TO RIDE AND CO-SHARE A LEGACY ELEVATOR WITH HUMAN(S)". This application also claims priority to Singapore Patent Application No. 10202400501W filed on Feb. 23, 2024. The entireties of the above-mentioned patent application are incorporated herein by reference for all purposes.

FIELD OF THE INVENTION

The present disclosure relates to a system for an autonomous mobile robot to ride an elevator, and more particularly to a system and a method for an autonomous mobile robot to ride and co-share an elevator with humans.

BACKGROUND OF THE INVENTION

Autonomous Mobile Robots (AMRs) are increasingly utilized in a variety of industries and application to automate the moving and handling of various goods and materials. However, in most applications, AMRs can only operate in a single floor space or level in a building. This is due to the limited capability of AMRs to access, move in and out of and operate elevators.

Recent urban buildings have introduced smart elevators that can be controlled by AMRs through various communication channels. This includes a communication interface for getting elevator info, elevator call, elevator status monitoring, and call monitoring.

Challenges remain for AMRs to access most elevators in urban buildings which do not have such communication interface for legacy elevators. Recent works have proposed AMRs that can ride a legacy elevator, but they either require human intervention (e.g. press button by human) or require dedicated elevators for AMRs without co-sharing with humans.

Therefore, there is a need of providing a system and a method for an autonomous mobile robot to ride and co-share a legacy elevator with humans without human intervention and without communication interface with elevator control system, so as to overcome the drawbacks of the conventional technologies.

SUMMARY OF THE INVENTION

An object of the present disclosure is to provide a system and a method for an autonomous mobile robot (AMR) to ride and co-share an elevator with humans without human intervention and without communication interface with the elevator control system. The AMR with the system and the method of the present disclosure is able to ride an elevator with human crowd, and able to interact with human during elevator riding and respond to different exception cases. Those functions are supportive of the entire elevator riding operation lifecycle across multiple floors. It facilitates the AMR to use elevators without requiring API (Application Programming Interface) to communicate. Since most elevators do not have smart communication interface, the AMR with the system and the method of the present disclosure allows interaction with most elevator types, and therefore there is no need for any modification of elevator.

Another object of the present disclosure is to provide a system and a method for an autonomous mobile robot (AMR) to ride and co-share an elevator with humans without human intervention and without communication interface with the elevator control system. Its core software modules can be used on existing AMRs systems or newly created AMRs. The AMR with the system and the method of the present disclosure provides a variety of functions, in particular, the key functions of surrounding recognition and localization of landmarks (e.g., button panel inside and outside of elevator), button activation, door status, elevator moving status (by sensors such as camera, LiDAR, pressure sensor, barometers, IMU); determining the waiting/standby position, the space occupation and clearance, and in/out path; and interacting with human(s) for safety and convey intended motion. These features and functions enable the AMR to perform the necessary steps to ride an elevator under normal conditions and realize the human interaction and exceptional handling.

In accordance with an aspect of the present disclosure, a system for an autonomous mobile robot (AMR) to ride and co-share an elevator with humans without human intervention and without communication interface with the elevator control system is provided. The system includes a human detection and localization module, a human identification and state estimation module, a human-robot-interaction module, and an elevator confined space positioning module. The human detection and localization module is configured to detect and locate at least one human relative to an AMR. The human identification and state estimation module is connected to the human detection and localization module and configured to identify and estimate a state of the at least one human. The human-robot-interaction module is connected to the human identification and state estimation module. The elevator confined space positioning module is connected to the human detection and localization module, the human identification and state estimation module and the human-robot-interaction module. Upon an elevator riding task is started, the human detection and localization module and the human identification and state estimation module are configured to detect and count the at least one human inside and/or outside the elevator, and the human-robot-interaction module is configured to interact with the at least one human. The elevator confined space positioning module is configured to carry out a space positioning inside the elevator according to a result of detecting and counting the at least one human through the human detection and localization module and the human identification and state estimation module, and chooses to enter the elevator or restart another elevator riding task.

In an embodiment, the system further includes a sensing and perception module configured to pre-process sensor data of a perception source, integrate information from the sensor data and transmit the sensor data.

In an embodiment, the system further includes an elevator landmark detection and localization module connected to the sensing and perception module, wherein the elevator landmark detection and localization module is configured to locate elevator door and elevator buttons inside and outside the elevator according to the sensor data.

In an embodiment, the system further includes an elevator actuator module, wherein the elevator actuator module is configured to operate the elevator buttons.

In an embodiment, the sensing and perception module is further configured to receive the perception source for filtering and fusing.

In an embodiment, the perception source is captured through a 2D/3D camera, a 2D/3D LiDAR, a sensor array or a combination thereof.

In an embodiment, the human detection and localization module and the human identification and state estimation module are connected to the sensing and perception module to receive human features, and are configured to cooperate to provide human poses and human count to the human-robot-interaction module based on the human features.

In an embodiment, the human-robot-interaction module comprises an human-machine-interface (HMI) (e.g., touch screen panel) allowing a user to interact with the autonomous mobile robot and configured to provide inputs and receive visual display or aids (e.g., facial expressions, prompts/captions)

In an embodiment, the human-robot-interaction module comprises an audio input/output array (speaker, microphone) for audio interaction with the at least one human.

In an embodiment, the human-robot-interaction module comprises a LED signal indicator for additional visual display or aids (e.g., different LED color indicates the AMR state of motion).

In accordance with an aspect of the present disclosure, a method for an autonomous mobile robot (AMR) to ride and co-share an elevator with humans without human intervention and without communication interface with the elevator control system is provided. The method includes steps of: (a) navigating an autonomous mobile robot to an elevator lobby, and detecting and locating at least one human relative to the autonomous mobile robot, and identifying and estimating a state of the at least one human by the mobile robot; (b) pressing a button on a call panel by the autonomous mobile robot so as to start an elevator riding task of an elevator; (c) detecting whether the elevator is in a door-open state or a door-close state by the autonomous mobile robot; (d) detecting the at least one human inside and outside the elevator, and counting the at least one human by the autonomous mobile robot in response to the elevator is in the door-open state; and (e) carrying out a space positioning inside the elevator according to a result of detecting and counting the at least one human by the autonomous mobile robot, and choosing to enter the elevator or restart another elevator riding task.

In an embodiment, the method further includes a step of (f1) determining the at least one human inside and outside the elevator and determining positions and counts of the at least one human.

In an embodiment, the method further includes a step of (f2) estimating an occupancy state of the elevator with reference to a 2D map related to a space inside the elevator and determining which elevator floor panel to use.

In an embodiment, the method further includes a step of (f3) navigating the autonomous mobile robot into the elevator.

In an embodiment, the method further includes a step of (f4) determining an available position with traversable paths and determining an elevator floor panel to use.

In an embodiment the method further includes a step of (f5) determining an optimal position to wait in the elevator.

In the embodiment, the method further includes a step of a step of (f6) interacting with the at least one human for exception handlings in one or more conditions of: the at least one human is blocking the call panel, the at least one human enters/exits the elevator, or the at least one human is blocking a floor panel.

In an embodiment, the step of interacting with the at least one human includes providing visual displays on HMI/LED or voice commands.

In an embodiment, the method further includes a step of (g1) stopping motion in response to the at least one human entering a safety stop zone of the autonomous mobile robot and alerting the at least one human by using the visual display on HMI/LED or the voice commands.

In an embodiment, the method further includes a step of (g2) notifying the at least one human in the elevator of the autonomous mobile robot's intended motion by using the visual display on HMI/LED or the voice commands.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
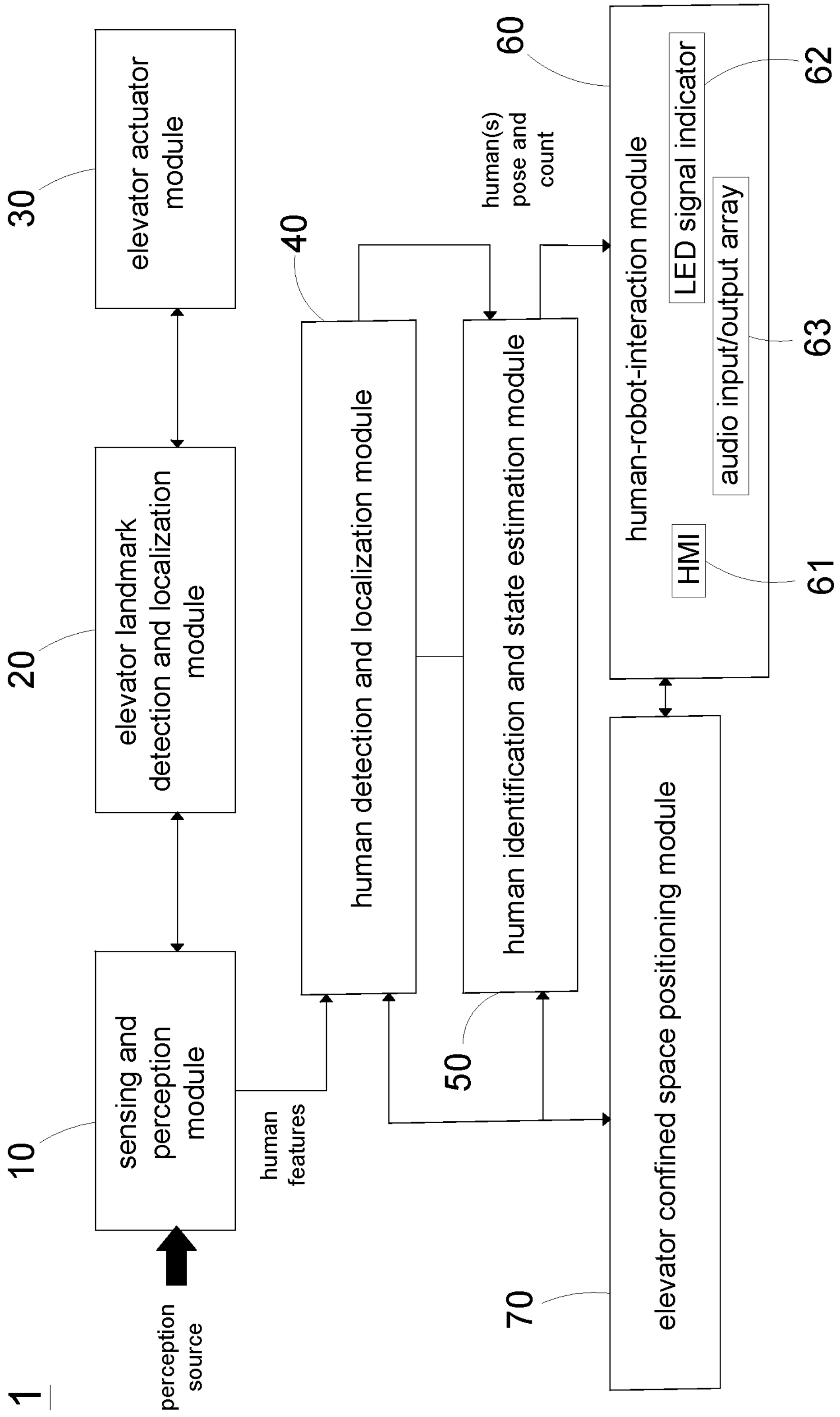
FIG. 1 is a schematic diagram illustrating a system for an autonomous mobile robot to ride and co-share an elevator with humans according to an embodiment of the present disclosure.

FIG. 1 is a schematic diagram illustrating a system for an autonomous mobile robot to ride and co-share an elevator with humans according to an embodiment of the present disclosure. The present disclosure provides a system 1 for an autonomous mobile robot (AMR) to ride and co-share an elevator with humans without human intervention and without communication interface with the elevator control system. Accordingly, the system 1 can be applied to conventional/legacy elevators, smart elevators, etc. The system 1 includes a human detection and localization module 40, a human identification and state estimation module 50, a human-robot-interaction module 60, and an elevator confined space positioning module 70. The human detection and localization module 40 is configured to detect and locate at least one human relative to an autonomous mobile robot (AMR). The human identification and state estimation module 50 is connected to the human detection and localization module 40 and configured to identify and estimate a state of the at least one human. The human-robot-interaction module 60 is connected to the human identification and state estimation module 50. The elevator confined space positioning module 70 is connected to the human detection and localization module 40, the human identification and state estimation module 50 and human-robot-interaction module 60.

In addition, the system 1 further includes a sensing and perception module 10 for pre-processing of sensor data (e.g., filtering) and information integration (e.g., two LiDAR point cloud merging, color and depth image alignment), information pre-processing (e.g., image feature extraction and processing pressure sensor data), and transmission of original sensors using communication. Preferably but not exclusively, the sensing and perception module 10 is connected to the human detection and localization module 40 and the human identification and state estimation module 50, and configured to receives perception source for filtering and fusing. The perception source can be captured through a 2D/3D camera, a 2D/3D LiDAR, a sensor array or a combination thereof. The present disclosure is not limited thereto. In the embodiment, the human detection and localization module 40 and the human identification and state estimation module 50 are connected to the sensing and perception module 10 to receive human features and cooperated to provide human poses and human count to the human-robot-interaction module 60 based on the human features.

The system 1 also includes an elevator landmark detection and localization module 20 connected to the sensing and perception module 10, and an elevator actuator module 30 connected to the elevator landmark detection and localization module 20. The elevator landmark detection and localization module 20 allows to locate elevator door and elevator buttons inside and outside. The elevator actuator module 30 allows to actuate/press the elevator buttons. With those above modules of the system 1, the AMR is able to detect the elevator lobby landmark, move to the front of elevator call button panel and press elevator call button, detect elevator door and determines door state, wait for elevator door open and enter the elevator, orientate itself within elevator and detect elevator floor button, move to elevator floor button panel and press elevator floor button, orientate itself within elevator and detect elevator door, and wait for elevator door to open and exit elevator. In that, the AMR achieves the elevator riding under normal conditions.

Notably, in the embodiment, the human-robot-interaction module 60 enables the AMR to interact with human in a safe, efficient and effective manner. Preferably but not exclusively, the human-robot-interaction module 60 includes a 1) human-machine-interface (HMI) 61 (e.g., touch screen panel) where the user or passenger can interact with AMR and provide input and receive visual display or aids (e.g., facial expressions, prompts/captions; 2) audio input/output array 63 (e.g., microphone, speaker) for audio interaction; and 3) LED signal indicator 62 for additional visual display or aids (e.g., different LED color indicates AMR state of motion.) With those modules of the system 1, the AMR is further able to interact with the humans for exception handlings.

Figure 2:
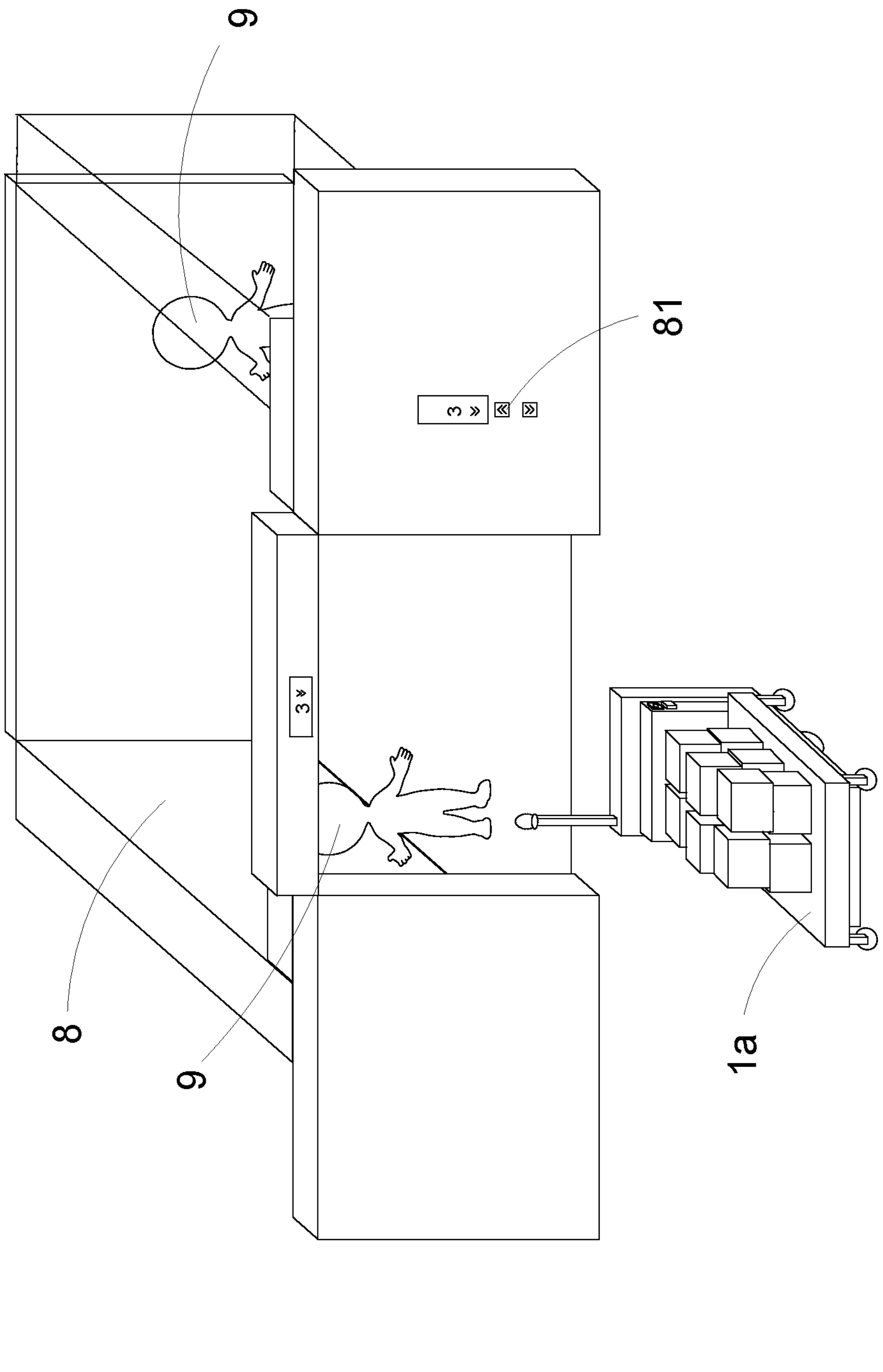
FIG. 2 and FIG. 3 schematically show the autonomous mobile robot with the system determining the elevator in a door-open state and in a door-close state, respectively.
Figure 3:
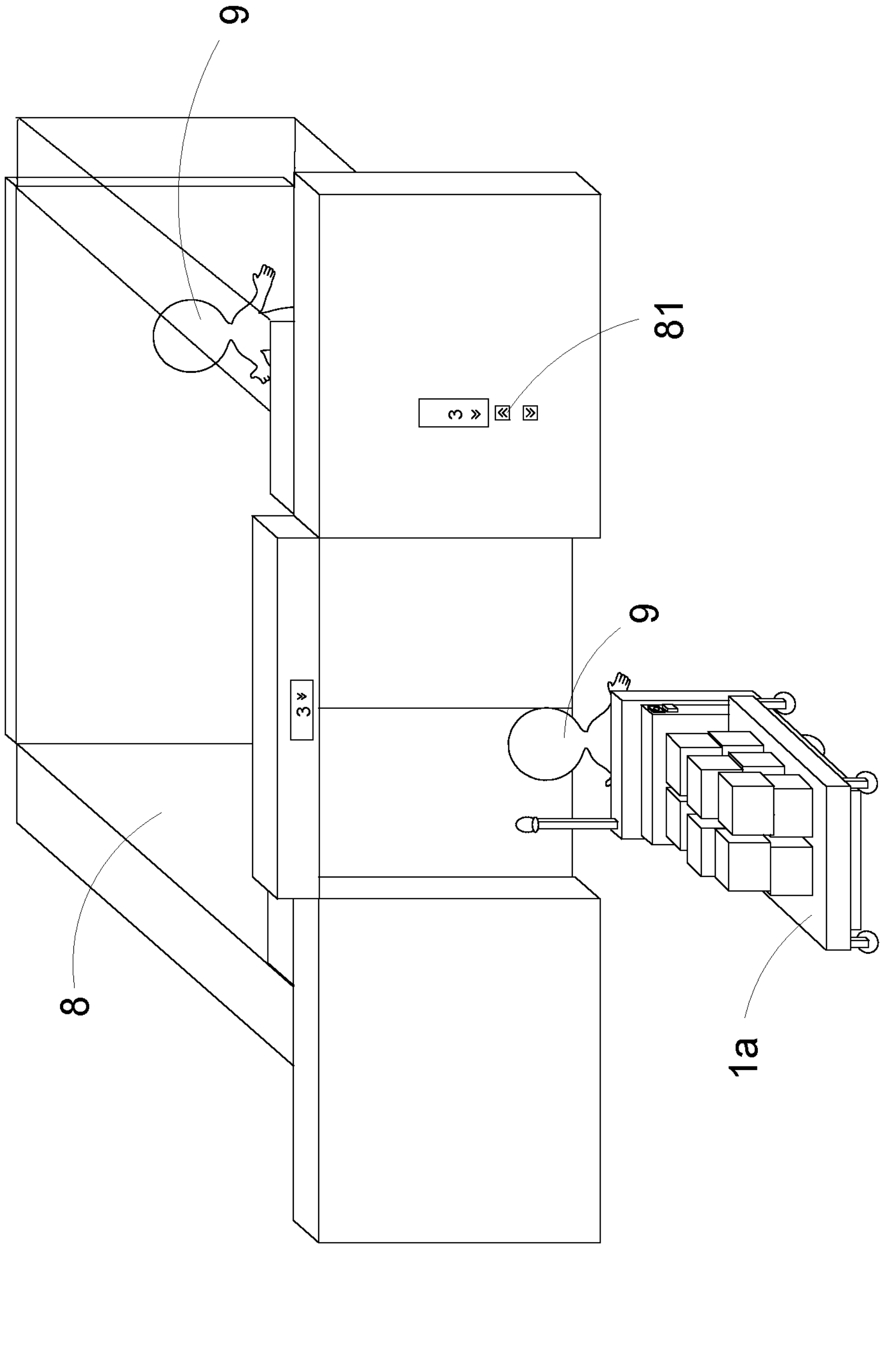

Based on the system 1 of the present disclosure, a method for an autonomous mobile robot to ride and co-share an elevator with humans is disclosed at the same time. Further referring to the embodiment in FIG. 2, in order to ride an elevator, the AMR 1*a* has to be navigated to an elevator lobby and locate elevator door and elevator buttons (inside and outside). In the embodiment, the AMR 1*a* allows to detect and locate at least one human relative to the AMR 1*a* through the human detection and localization module 40, and allows to identify and estimate a state of the at least one human through the human identification and state estimation module 50. Preferably but not exclusively, the AMR 1*a* with the system 1 is allowed to approach a call panel 81 and press a button on the call panel 81 to start an elevator riding task of an elevator 8. When the elevator riding task is started, the AMR 1*a* can detect the elevator 8 to determine that the elevator is in a door-open state or a door-close state. Furthermore, the at least one human 9 inside and outside the elevator 8 is detected and counted through the human detection and localization module 40 and the human identification and state estimation module 50 when the elevator 8 is in the door-open state, as shown in FIG. 2. Thereafter, the elevator confined space positioning module 70 carries out a space positioning inside the elevator 8 according to a result of detecting and counting the at least one human through the human detection and localization module 40 and the human identification and state estimation module 50, and choosing to enter the elevator 8 or restart another elevator riding task of the elevator 8. On the other hand, in case of that the elevator 8 is in the door-close state or the elevator door is blocking by the at least one human 9, as shown FIG. 3, the AMR 1*a* allows to interact with the at least one human 9 through the human-robot-interaction module 60 for safety and convey intended motion. It will be detailed later.

Figure 4A:
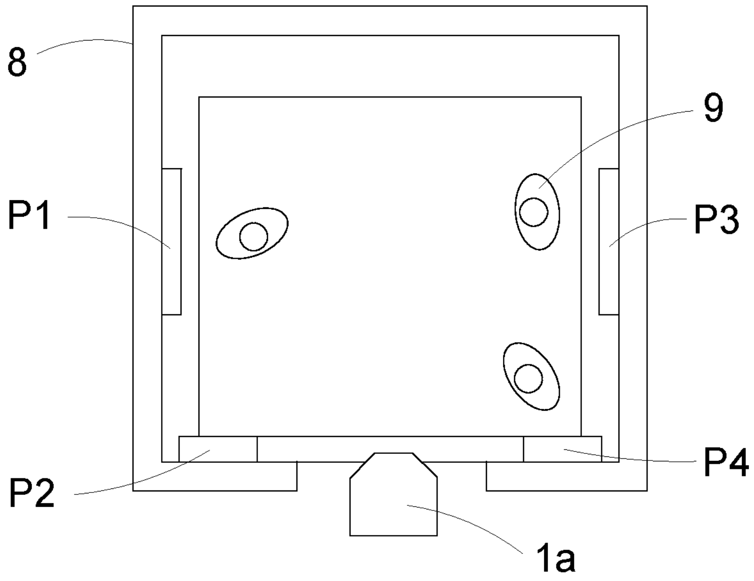
FIG. 4A and FIG. 4B schematically show random cases after the autonomous mobile robot with the system scan its proximity inside the elevator and count humans, respectively.
Figure 4B:
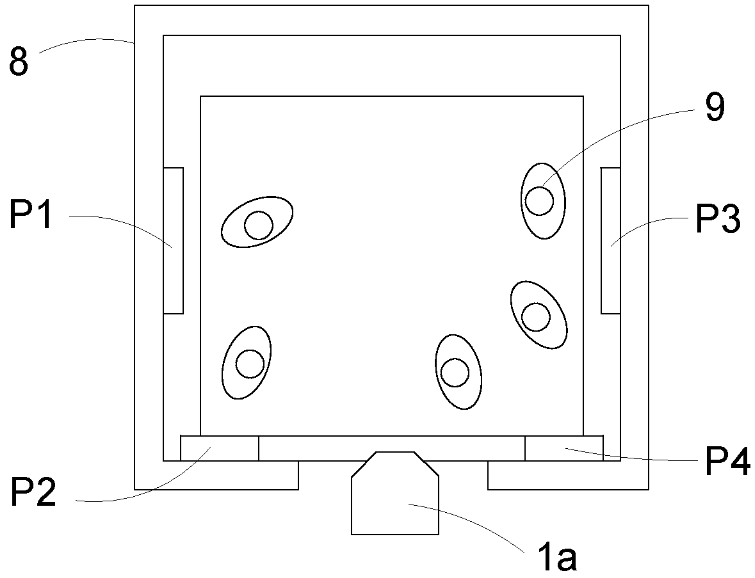
Figure 5A:
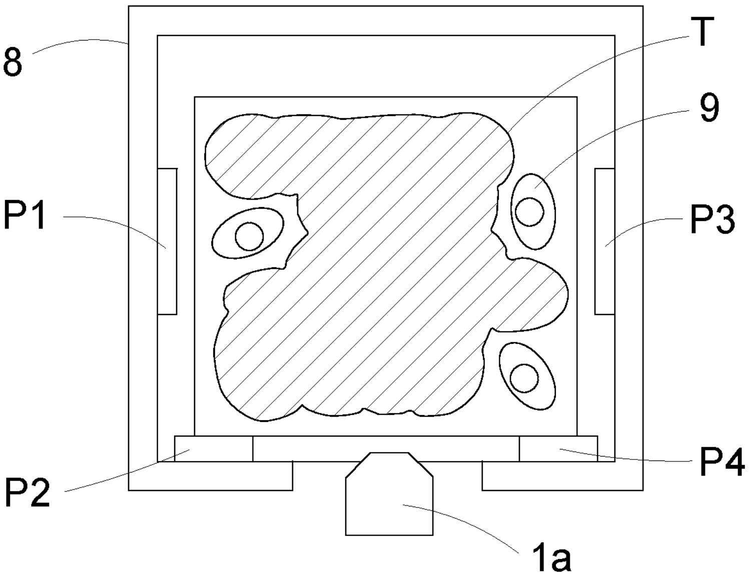
FIG. 5A and FIG. 5B schematically show the autonomous mobile robot determining an occupancy state of the elevator in FIG. 4A and FIG. 4B, respectively.
Figure 5B:
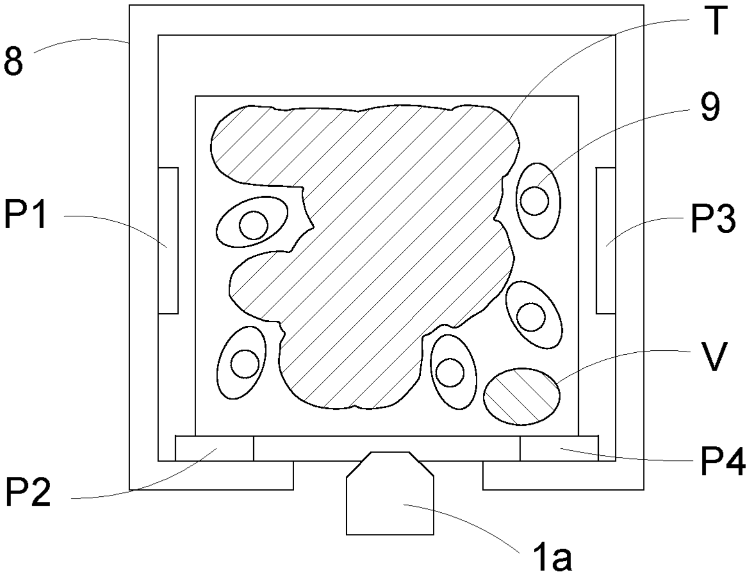
Figure 6A:
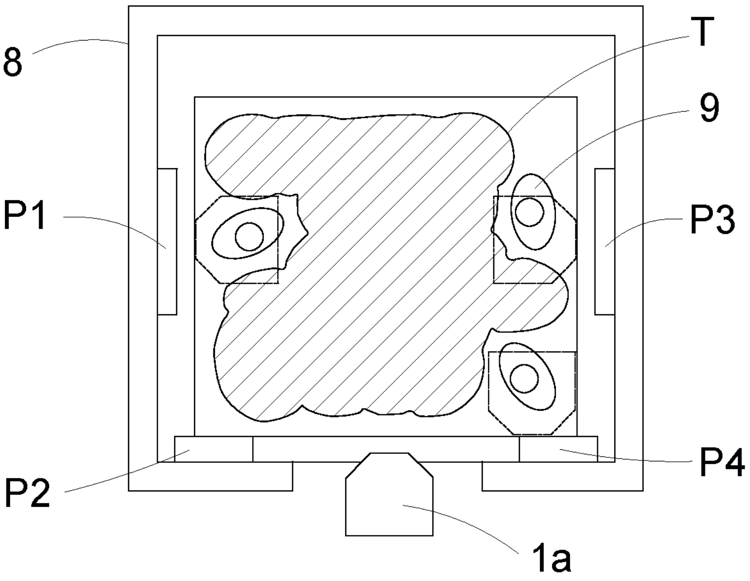
FIG. 6A and FIG. 6B schematically show the autonomous mobile robot determines an available position with traversable paths and determining an elevator floor panel to use in FIG. 5A and FIG. 5B.
Figure 6B:
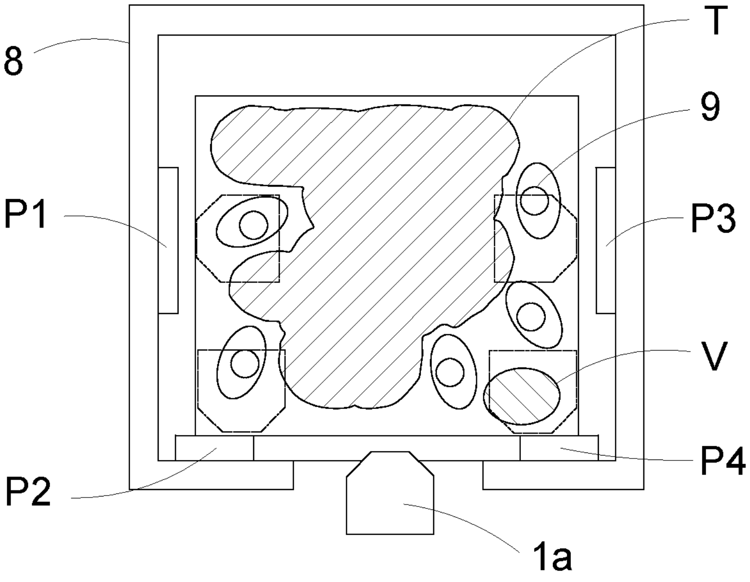

In the embodiment, the AMR 1*a* is able to determine the at least one human in and outside the elevator 8 and the positions and counts of the at least one human 9. For effective co-share of the elevator 8 with humans 9, the AMR 1*a* needs to position itself in the elevator 8 according to where the human(s) 9 is/are standing within the elevator 8. Notably, after the elevator confined space positioning module 70 carries out a space positioning inside the elevator 8, the AMR 1*a* can scan its proximity inside the elevator 8 and count human(s) 9. After scanning, the AMR 1*a* can perform elevator occupancy state estimation to identify vacant space and traversable space inside the elevator 8. FIGS. 4A to 4B show two random cases after AMR 1*a* scan its proximity inside the elevator 8 and count humans 9. In the embodiment, the AMR 1*a* estimates an occupancy state of the elevator with reference to 2D map and determines which elevator floor panel to use. Furthermore, the AMR 1*a* determines an available position with traversable paths and determining an elevator floor panel to use. In the embodiment, the elevator 8 has multiple vertical elevator floor panels P2, P4 and horizontal elevator floor panels P1, P3. The AMR 1*a* may pre-determine to use only one selected panel or decide which one to use. In the random case of FIG. 4A, the AMR 1*a* performs an elevator occupancy state estimation to identify the traversable space T, as shown in FIG. 5A. In the random case of FIG. 4B, the AMR 1*a* performs an elevator occupancy state estimation to identify the vacant space V and the traversable space T. Preferably but not exclusively, based on the elevator occupancy state, the AMR 1*a* can determine the best waiting position (i.e. the optimal position to wait in the elevator 8) with the following considerations: pre-defined preferred panel (e.g., vertical left elevator floor panel P4), safety distance or maximum distance from human passenger, and shortest distance from AMR current pose. The best waiting position can be determined based on the lowest decision cost, and the present disclosure is not limited thereto. In the random case of FIG. 4A and FIG. 5A, the AMR 1*a* can decide the elevator floor panel P2 is the best one and accesses to the elevator floor panel P2, as shown in FIG. 6A. In the random case of FIG. 4B and FIG. 5B, the AMR 1*a* is pre-determined to use the elevator floor panel P4 merely. As shown in FIG. 6B, after computing, the elevator floor panel P4 is not accessible, and the AMR 1*a* will interact with human 9 through the human-robot-interaction module 60 for exception handling, for example, providing visual display on the HMI 61/LED signal indicator 62 or voice output by audio input/output array 63 to notify passengers to move aside.

After determining the target destination floor, the AMR 1*a* is navigated into the elevator. For navigating the AMR 1*a* into the elevator, the AMR 1*a* may take a waiting point at entrance of elevator, a midway point between the elevator doors and the elevator center. Certainly, the navigating path is adjustable according to the practical requirements, and the present disclosure is not limited thereto.

Figure 7A:
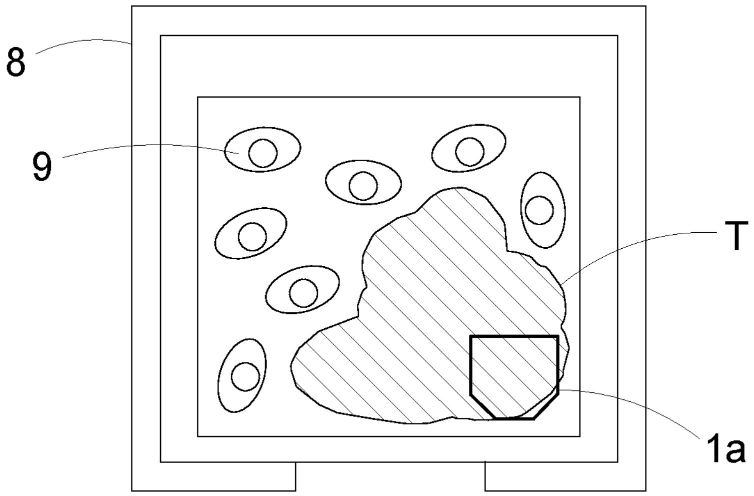
FIG. 7A and FIG. 7B schematically show two random cases after the autonomous mobile robot with the system scan its proximity inside the elevator and count humans.
Figure 7B:
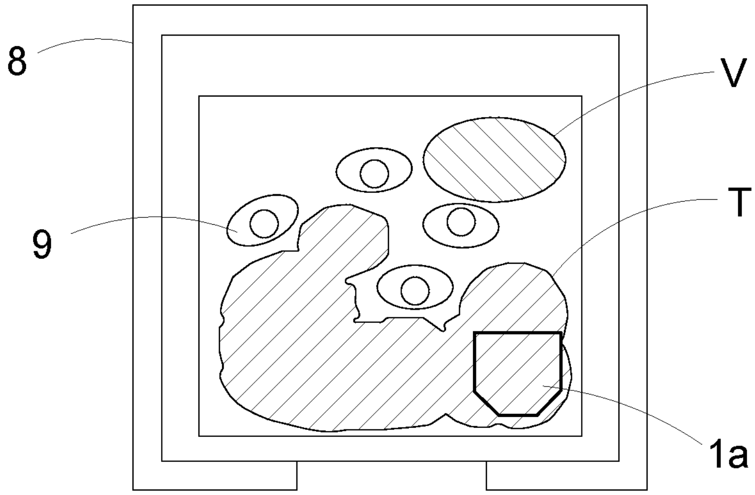
Figure 8A:
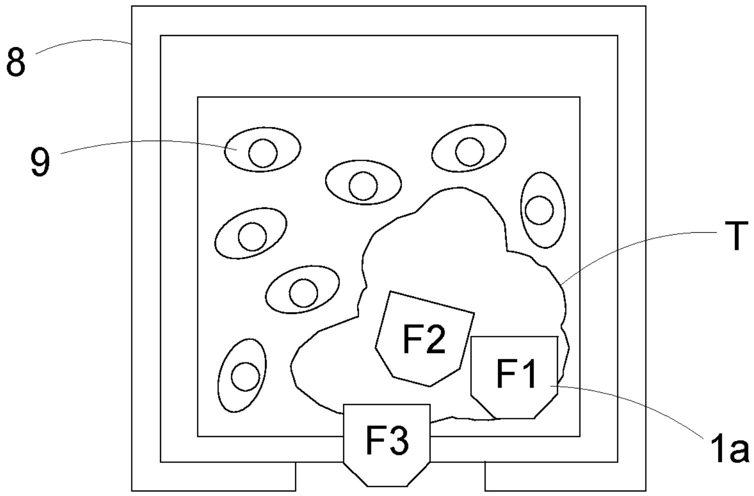
FIG. 8A and FIG. 8B schematically show the autonomous mobile robot determines determine an optimal position to wait in the elevator in FIG. 7A and FIG. 7B.
Figure 8B:
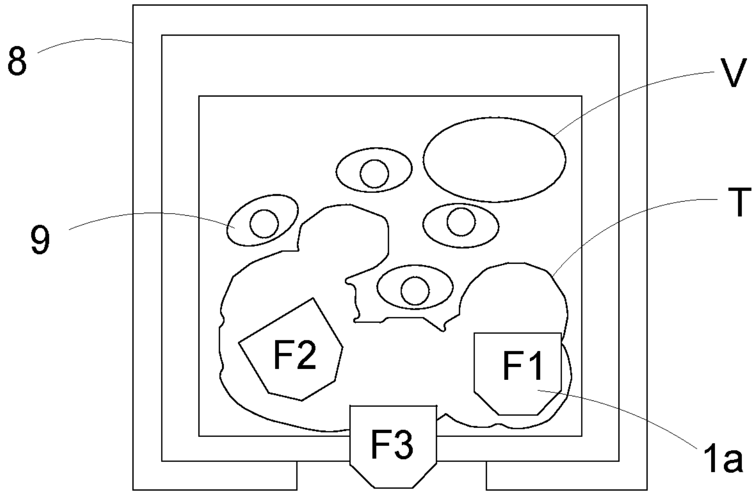

In the embodiment, the AMR 1*a* needs to position itself in the elevator according to where the human(s) is/are standing within the elevator. When the AMR 1*a* estimates the occupancy state of an elevator with reference to a 2D map and determine the available positions, the AMR 1*a* can wait with transvers-able path(s) and determine the best position it should take. In the embodiment, the AMR 1*a* can determine an optimal position to wait in the elevator based on the following consideration: pre-defined preferred location (e.g., the central position); safety distance or maximum distance from human passenger; and AMR's next intended position (based on its next task). FIGS. 7A and 7B show two random cases after AMR 1*a* scan its proximity inside the elevator 8 and count humans 9. As shown in the random case of FIG. 7A, the AMR 1*a* performs an elevator occupancy state estimation to identify the traversable space T. As shown in the random case of FIG. 7B, the AMR 1*a* performs an elevator occupancy state estimation to identify the vacant space V the traversable space T. In the random case of FIG. 7A, the AMR 1*a* can move from the current pose F1 to the optimal waiting pose F2, and wait for next task F3, as shown in FIG. 8A. Similarly, in the random case of FIG. 7B, the AMR 1*a* can move from the current pose F1 to the optimal waiting pose F2, and wait for next task F3, as shown in FIG. 8B. Certainly, the AMR 1*a* can position itself in the elevator according the practical requirements for effective co-share of the elevator with humans, and the present disclosure is not limited thereto.

When the AMR 1*a* arrives at the destination floor, the AMR 1*a* navigates out of the elevator to the elevator lobby at the destination floor. In the elevator lobby, the AMR 1*a* switches to the map of the destination floor and orientate and position itself based on the map of destination floor. Certainly, the present disclosure is not limited thereto.

Notably, during the entire process of elevator riding, it is necessary for the AMR to detect, count and localize human(s) in its proximity (e.g., the elevator lobby, inside the elevator). This is required for co-sharing elevator with human and the associated exception handling cases. Possible scenarios include: passenger(s) blocking the elevator call button panel, passenger(s) entering the elevator (when the AMR is entering elevator), passenger(s) exiting the elevator (when the AMR is entering elevator), passenger(s) blocking the elevator entrance, the elevator being full (when the AMR is entering elevator), passenger(s) blocking the elevator floor button panel, the AMR determining an optimal position to wait in the elevator (depending on where human(s) are standing), the elevator central/preferred position being occupied, passenger(s) entering the elevator (when the AMR is exiting the elevator), passenger(s) exiting the elevator (when AMR is exiting the elevator), passenger(s) blocking the elevator entrance. When the above scenarios occur, such that the AMR needs to interact with humans for safety and convey intended motion, the AMR with the system 1 of the present disclosure allows to interact with human(s) for the exception handling during the entire operation lifecycle of elevator riding.

In case of that passenger(s) is blocking elevator call button panel, the AMR with the system 1 of the present disclosure identifies the current button status by asking the passenger(s), or informing the passenger(s) to move aside in order to be able to see the panel through the use of visual display on HMI/LED or voice commands (audio output) of the human-robot-interaction module 60 to interact with humans.

Furthermore, when AMR is pressing the elevator call button or elevator floor button, the AMR can also assist people to press required elevator button through the human-robot-interaction module 60. The AMR can ask passengers if there is a button they would like to press, and based on the response, the AMR can press the required button. When passenger(s) is entering the elevator (when AMR is entering or exiting the elevator), or when passenger(s) is blocking the elevator floor button panel, the AMR can notify the passenger through the use of visual display on HMI/LED or voice commands (audio output) of the human-robot-interaction module 60 to interact with humans. The AMR can wait for passengers to move out/in first (for the purposes of safety and collision avoidance), and proceed to take action (e.g. entering or taking the next elevator) after evaluating the remaining time for door closing and currently occupied capacity of the elevator. In case of that the central/preferred position in the elevator is occupied, the AMR can notify the passengers by using visual display on HMI/LED or voice commands to inform the passengers of AMR's intended movement (e.g. keeping left or keeping right). In the embodiment, the AMR can use visual display on HMI/LED or voice commands to inform passengers that AMR will be moving to a specific position in the elevator (e.g., the center) and requesting them to move aside. In the embodiment, exiting the elevator is of greater priority than entering, and AMR will voice out it is exiting and request passenger to move aside. The AMR will proceed to exit the elevator when the passenger moves, while will stop the movement if the passenger does not give way. This is for safety and collision avoidance. In the embodiment, when the AMR needs to interact with human for safety and convey intended motion, the AMR can notify the human(s) in the elevator of AMR's intended motion (e.g., keeping left or moving right). If a human enters a safety stop zone (e.g. a 30-cm surrounding area around the AMR, depending on the safety scheme of the AMR), the AMR will stop moving and alerts the human(s) by using visual display on HMI/LED or voice command. Certainly, the AMR with the system 1 of the present disclosure allows to perform a lot of functions for the AMR to ride and co-share an elevator with humans without human intervention and without communication interface with the elevator control system. The present disclosure is not limited to the above-mentioned embodiments, and not redundantly described hereafter.

Figure 9:
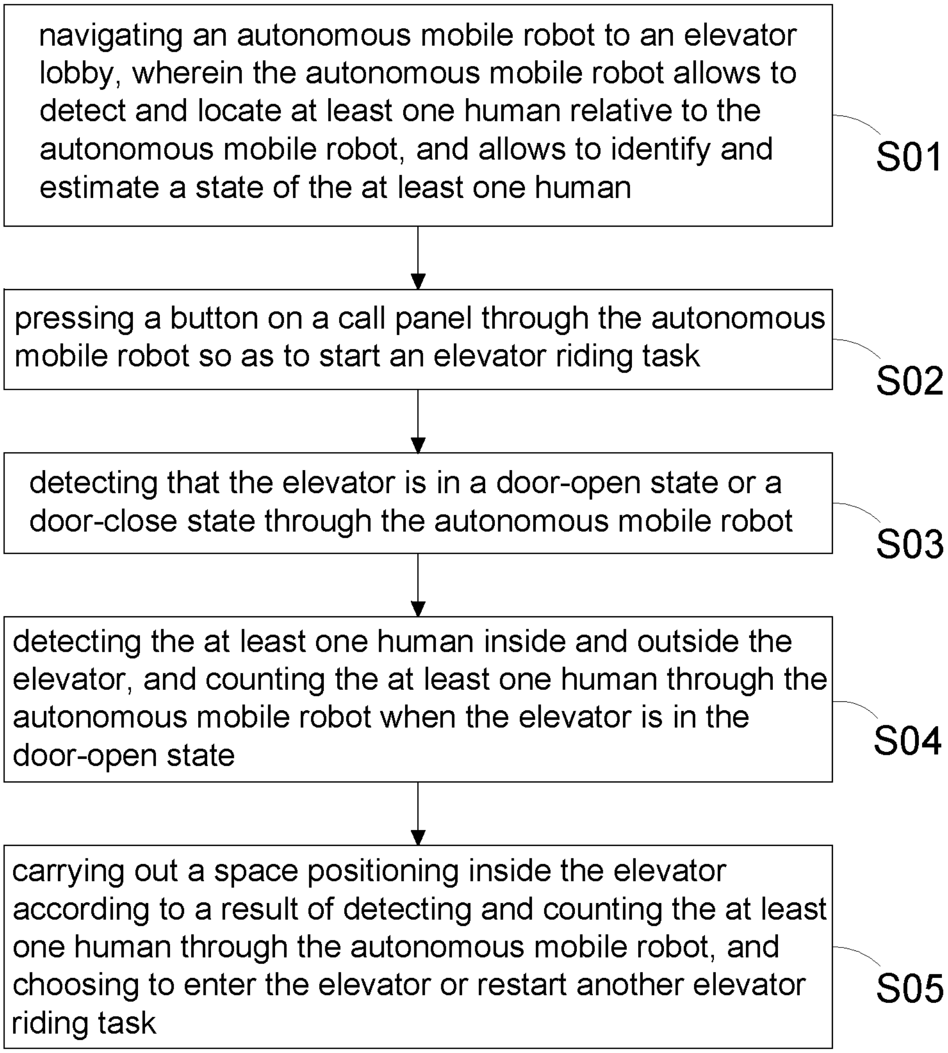
FIG. 9 is a flow chart illustrating a method for an autonomous mobile robot to ride and co-share an elevator with humans according to an embodiment of the present disclosure.

FIG. 9 is a flow chart illustrating a method for an autonomous mobile robot to ride and co-share an elevator with humans according to an embodiment of the present disclosure, which is applicable for the system illustrated in FIG. 1. As shown in FIG. 9, the method includes steps S01 to S05. In the step S01, an autonomous mobile robot is navigated to an elevator lobby. In the embodiment, the autonomous mobile robot allows to detect and locate at least one human relative to the autonomous mobile robot, and allows to identify and estimate a state of the at least one human. In the step S02, a button on a call panel is pressed through the autonomous mobile robot so as to start an elevator riding task. In the step S03, the autonomous mobile robot detects that the elevator is in a door-open state or a door-close state. In the step S04, when the elevator is in the door-open state, the autonomous mobile robot further detects the at least one human inside and outside the elevator, and counts the at least one human. In the step S05, the autonomous mobile robot carries out a space positioning inside the elevator according to a result of detecting and counting the at least one human, and chooses to enter the elevator or restarts another elevator riding task. By performing the necessary steps S01 to S05, the autonomous mobile robot can ride the elevator under normal conditions and realize the human interaction and exceptional handling. It facilitates the autonomous mobile robot to use elevators without any modification of elevator.

In summary, the present disclosure provides a system and a method for an autonomous mobile robot (AMR) to ride and co-share an elevator with humans without human intervention and without communication interface with the elevator control system. The AMR with the system and the method of the present disclosure is able to ride an elevator with human crowd, and able to interact with human during elevator riding and respond to different exception cases. Those functions are supportive of the entire elevator riding operation lifecycle across multiple floors. It facilitates the AMR to use elevators without requiring API (Application Programming Interface) to communicate. Given that most elevators do not have such smart communication interface, the AMR with the system and the method of the present disclosure allows interaction with most elevator types, and therefore there is no need for any modification of the elevator. Its core software modules can be used on existing AMRs systems or newly created AMRs. The AMR with the system and the method of the present disclosure provides a variety of functions, in particular, the key functions of surrounding recognition and localization of landmarks (e.g., button panel inside and outside of elevator), button activation, door status, elevator moving status (by sensors such as camera, LiDAR, pressure sensor, barometers, IMU); determining the waiting/standby position, the space occupation and clearance, and in/out path; and interacting with human(s) for safety and convey intended motion. These features and functions enable the AMR to perform the necessary steps to ride an elevator under normal conditions and realize the human interaction and exceptional handling.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for an autonomous mobile robot to ride and co-share an elevator with humans, comprising steps of:

(a) navigating an autonomous mobile robot to an elevator lobby, and detecting and locating at least one human relative to the autonomous mobile robot, and identifying and estimating a state of the at least one human by the autonomous mobile robot;

(b) pressing a button on a call panel by the autonomous mobile robot so as to start an elevator riding task;

(c) detecting whether the elevator is in a door-open state or a door-close state by the autonomous mobile robot;

(d) detecting the at least one human inside and outside the elevator, and counting the at least one human by the autonomous mobile robot in response to the elevator is in the door-open state; and (e) carrying out a space positioning inside the elevator according to a result of detecting and counting the at least one human by the autonomous mobile robot, wherein the autonomous mobile robot performs an elevator occupancy state estimation to identify an available position with at least one traversable path, and chooses to enter the elevator or restart another elevator riding task, wherein the step (e) further comprises determining an elevator floor panel to use by the autonomous mobile robot and determining an optimal position to wait in the elevator with considerations of at least the elevator occupancy state and the elevator floor panel to use.

2. The method according to claim 1, further comprising a step of (f1) determining the at least one human inside and outside the elevator and determining positions and counts of the at least one human.

3. The method according to claim 1, further comprising a step of (f2) estimating an occupancy state of the elevator with reference to a 2D map related to a space inside the elevator and determining which elevator floor panel to use.

4. The method according to claim 1, further comprising a step of (f3) navigating the autonomous mobile robot into the elevator.

5. The method according to claim 1, further comprising a step of (f6) interacting with the at least one human for exception handlings in one or more conditions of: the at least one human is blocking the call panel, the at least one human enters/exits the elevator, or the at least one human is blocking a floor panel.

6. The method according to claim 5, wherein the step of interacting with the at least one human comprises providing visual displays on an HMI/LED or voice commands.

7. The method according to claim 6, further comprising a step of (g1) stopping motion in response to the at least one human entering a safety stop zone of the autonomous mobile robot, and alerting the at least one human by using the visual display on HMI/LED or the voice commands.

8. The method according to claim 6, further comprising a step of (g2) notifying the at least one human in the elevator of the autonomous mobile robot's intended motion by using the visual display on HMI/LED or the voice commands.

* * * * *